United States Patent [19]

Yamaguchi et al.

[11] 4,264,469

[45] Apr. 28, 1981

[54] CELLULAR THERMOPLASTIC RESINS WITH MIXED BLOWING AGENTS

[75] Inventors: Yutaka Yamaguchi, Yuki; Atsuo Sasama, Shimodate, both of Japan

[73] Assignee: Hitachi Chemical Company, Ltd., Tokyo, Japan

[21] Appl. No.: 59,556

[22] Filed: Jul. 23, 1979

[30] Foreign Application Priority Data

Jul. 24, 1978 [JP] Japan .................... 53-90165
Jul. 24, 1978 [JP] Japan .................... 53-90167

[51] Int. Cl.$^3$ ............................. C06D 5/06; C08J 9/10
[52] U.S. Cl. ............................. 252/350; 264/DIG. 5; 521/88; 521/89; 521/90; 521/98; 521/143; 521/144; 521/145; 521/149; 521/910
[58] Field of Search .................. 252/350; 264/DIG. 5; 521/907, 98, 88, 89, 90

[56] References Cited

U.S. PATENT DOCUMENTS

| | | | |
|---|---|---|---|
| 3,278,466 | 10/1966 | Cram et al. | 521/98 |
| 3,321,413 | 5/1967 | Riley, Jr. et al. | 252/350 |
| 3,645,931 | 2/1972 | Normanton | 252/350 |

*Primary Examiner*—Morton Foelak
*Attorney, Agent, or Firm*—Craig and Antonelli

[57] ABSTRACT

Thermoplastic resin foams such as polyethylene foams having excellent appearance can be produced with high foaming stability by using a blowing agent composition comprising (a) azodicarbonamide, (b) dinitrosopentamethylenetetramine, and (c) a phenolic or propionate compound such as 1,3,5-tris(3,5-di-t-butyl-4-hydroxybenzyl)-s-triazine-2-4-6-(1H, 3H, 5H)trion.

6 Claims, 1 Drawing Figure

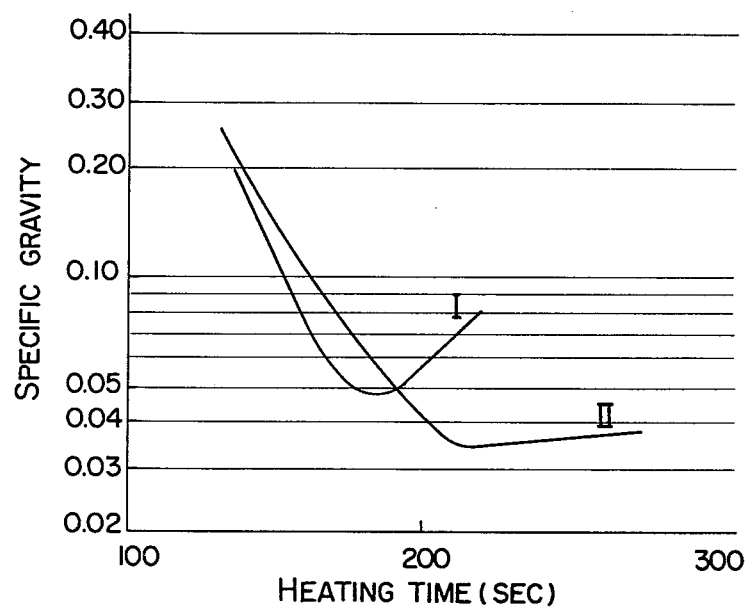

CELLULAR THERMOPLASTIC RESINS WITH MIXED BLOWING AGENTS

BACKGROUND OF THE INVENTION

This invention relates to a blowing agent composition and a process for producing thermoplastic resin foams using such a composition.

In a known process for obtaining foams by heating a thermoplastic resin preform containing a blowing agent, azodicarbonamide (hereinafter referred to as "AC"), the internal temperature of the preform is raised up by decomposition heat of the blowing agent during foaming and hence such internal temperature usually remains higher than the temperature on the external surface. Therefore, although AC in the inside of the foamed sheet is perfectly decomposed and whitened, AC in the surface layer undergoes insufficient decomposition and keeps its yellow color. Thus, foams obtained by using AC as blowing agent are almost unexceptionally colored in light yellow even when no specific coloring is made with a pigment or such, and it is hardly possible to obtain perfectly white products. Naturally, colored (yellow) products are of poor commercial value.

Several methods have been proposed for preventing such yellowing of foams obtained by using AC as blowing agent. There are known, for example, the following methods: a thermoplastic resin film is laminated on the surface of an expandable polyolefin resin preform so that the preform surface will be treated as an internal layer when foamed under heating, thereby to increase the extent of foaming in the surface layer and to allow obtainment of the perfectly whitened foams free of any undecomposed AC (Japanese Pat Appln Kokai (Laid-Open) No. 36773/74); ultraviolet rays are applied to the surface of a foam (Japanese Pat Appln Kokoku (Post-Exam Publn) No. 7473/68); a colored foam is treated with a heated hydrazine solution (Japanese Pat Appln Kokoku (Post-Exam Publn) No. 18636/71). Nevertheless, none of these methods is capable of attaining a well satisfactory result.

U.S. Pat. No. 3,278,466 shows techniques for foaming rubber or thermoplastic resins by using a blowing agent composition comprising AC and a second component such as benzene sulphonhydrazide, dinitrosopentamethylenetetramine or the like. However, use of such blowing agent composition results in an unstabilized foamed condition, and it is very difficult to obtain highly expanded foams with excellent appearance and smooth surface.

SUMMARY OF THE INVENTION

An object of this invention is to provide a blowing agent composition which is free of said problems accompanying the conventional processes.

Another object of this invention is to provide a process for producing thermoplastic resin foams such as polyolefin resin foams by using said blowing agent composition.

This invention provides a blowing agent composition for use in the production of cellular thermoplastic resins, comprising:

(a) azodicarbonamide,
(b) dinitrosopentamethylenetetramine, and
(c) at least one third component selected from the group consisting of octadecyl-3-(3,5-di-t-butyl-4-hydroxyphenyl)-propionate, 2,2'-thiodiethylbis-[3-(3,5-di-t-butyl-4-hydroxyphenyl)-propionate], pentaerythrityl-tetrakis-[3-(3,5-di-t-butylhydroxyphenyl)-propionate], 1,3,5-tris(3,5-di-t-butyl-4-hydroxybenzyl)-S-triazine-2-4-6-(1H, 3H, 5H)trion, 2,2'-methylenebis(4-ethyl-6-t-butylphenol), 2,5-di-t-butylhydroquinone, 2,5-di-t-amylhydroquinone, distearyl-3,3'-thiodipropionate, and 2,6-di-t-butyl-4-methylphenol.

This invention further provides a process for producing a thermoplastic resin foam which comprises mixing the blowing agent composition mentioned above with a thermoplastic resin to form an expandable resin preform and expanding the expandable resin preform with heating under normal pressure after introducing crosslinking structure into the expandable resin preform or in the course of introducing crosslinking structure thereinto.

BRIEF DESCRIPTION OF THE DRAWING

The accompanying drawing is a graph showing the relation between heating time (in hot air at 230° C.) and specific gravity of foams as measured in Comparative Example 1 (curve I) and Example 2 (curve II).

DETAILED DESCRIPTION OF THE PREFERRED EMBODIMENTS

Azodicarbonamide (AC), which is an essential component of the blowing agent composition according to this invention, is widely used recently for production of highly expanded articles of thermoplastic resins, particularly polyolefin resins, because of many advantageous properties such as high decomposition temperature (150°–200° C.), little danger of explosion or fire in treatment, release of a large quantity of decomposed gas which is intoxic, and easiness for producing uniform cells.

On the other hand, dinitrosopentamethylenetetramine (hereinafter referred to as "DPT"), which is mixed with AC, has the same level of decomposition temperature as AC but produces a great value of heat of decomposition and hence is liable to cause "burn mark or burn spot" in the foamed products. DPT is currently used for preparation of general rubber foams, vinyl choride resin foams and the like but scarcely used for the production of highly expanded articles with a degree of expansion of greater than 5 times. This is considered attributable to very voluminous internal heat generation of DPT when foamed, resulting in sharp change (lowering) of viscosity of polyolefin resin to retard stable foaming. Such sharp drop of viscosity makes it very hard to produce a highly expanded articles.

The present inventors found that mixing of a small quantity of DPT with AC can eliminate yellowing which is the greatest defect of foams using AC alone. However, the blowing agent composition formed from only AC and DPT still lacks stability during foaming and the obtained foams are unsatisfactory in appearance. According to this invention, a specific third component is mixed in a specified amount in the mixture of AC and DPT to obtain an improved blowing agent composition, and by use of such composition, it is possible to obtain very stable, highly expanded thermoplastic resin foam which is composed of colorless (white), uniform and fine cells and has improved touch.

The blending ratio of DPT to AC in the blowing agent composition of this invention is preferably within the range of 3 to 30 parts by weight, more preferably 5 to 15 parts by weight based on 100 parts by weight of AC. The DPT content of less than the above-said range fails to provide a sufficient whitening effect, while the DPT content exceeding the said range can not only produce no further improvement of the whitening effect but also causes emission of offensive formalin smell as a result of decomposition of DPT to pollute the environment.

In the present invention, addition of the third component (c) to the components (a) and (b) is very important and the third component (c) is an essential component of the present invention as mentioned below. In the production of polyolefin type resin foams by a conventional crosslinking foaming process under normal pressure, an antioxidant has not been used positively. Main reasons for using no antioxidant seems to be that foams are not used under such severe conditions as brings about a problem of oxidative degradation of the product during the use, and the antioxidant will not give good influence on the crosslinking reaction (degree of crosslinking will be lowered). Further, another reason for using no antioxidant positively in the crosslinking forming process under normal pressure is that significance of the addition of an antioxidant has not been known, in other words, effects caused by adding an antioxidant to a base resin or foamed product other than an effect of preventing degradation have not been known.

The purpose of adding the component (c) to the blowing agent composition in the present invention is not to impart simply an effect of preventing degradation to the resin but to impart other effects as mentioned in detail below. Such effects cannot be thought of from the conventional concept of the antioxidant and such effects can only be obtained when a special kind of antioxidant is mixed with a special kind of blowing agent composition.

The first effect of the third component (c) used in the blowing agent composition of this invention is to allow prominent stabilization of foaming. Although the functional mechanism of such a component is not yet definitely known, it is considered that this component acts to mitigate sharp decomposition of the composition resulting from excess heat generation by decomposition of DPT and to thereby stabilize the foaming behavior. Referring here to the accompanying drawing (a graph showing relation between heating time and specific gravity), it will be seen that foaming takes place more gently (that is, in a more stabilized way) in case of using a blowing agent composition (II) of this invention containing the component (c) than in case of using a composition (I) containing no component (c). The second effect of the component (c) is to allow obtainment of homogenous fine cells with high expansion (low specific gravity) as noted from the drawing. The third effect, as also appreciated from the drawing, is to allow maintenance of a highly foamed (low specific gravity) condition even after completion of foaming and to provide products with very stabilized quality. These effects conduce to very advantageous improvements for production of polyolefin resin foams.

The compounds of the component (c) are generally known as antioxidant, but said effects of the component (c) in use in said resin composition are quite inconceivable even for those skilled in the art from the conventional concention of antioxidants. Preferred for use as the component (c) in this invention are various kinds of phenolic compounds, particularly those having high heat resistance. In the case of crosslinking foaming, it is recommended to use a compound which scarcely affects crosslinkability of the thermoplastic resin. Such compound may be suitably selected from the following group of compounds: octadecyl-3-(3,5-di-t-butyl-4-hydroxyphenyl)-propionate, 2,2'-thiodiethylbis-[3-(3,5-di-t-butyl-4-hydroxyphenyl)-propionate], pentaerythrityltetrakis-[3-(3,5-di-t-butylhydroxyphenyl)-propionate], 1,3,5-tris-(3,5-di-t-butyl-4-hydroxybenzyl)-S-triazine-2-4-6-(1H, 3H, 5H)trion, 2,2'-methylenebis-(4-ethyl-6-t-butylphenol), 2,5-di-t-butylhydroquinone, 2,5-di-t-amylhydroquinone, distearyl-3,3'-thiodipropinate, and 2,6-di-t-butyl-4-methylphenol.

The component (c) is preferably added in an amount of 0.5 to 10 parts by weight, more preferably 0.5 to 5 parts by weight based on 100 parts by weight of a mixture of (a) AC and (b) DPT. As to the ratio of AC to DPT, 3 to 30 parts by weight of DPT is used based on 100 parts by weight of AC. The smaller loading of the component (c) than the above-said range results in unsatisfactory manifestation of its effect while the greater loading than said range does not lead to any additional improvement of said effect; it rather causes reduced viscosity of the thermoplastic resin mixed with the blowing agent composition, resulting in enlarged cells. It also tends to affect the crosslinking characteristics of the resin in the case of crosslinking foaming.

For production of polyolefin resin foams according to crosslinking foaming under normal pressure, the blowing agent composition is preferably used in an amount of 2 to 30 parts by weight based on 100 parts by weight of polyolefin resin.

Various kinds of thermoplastic resins such as low density, medium density and high density polyethylenes, polypropylenes, polybutene-1, ehtylenepropylene copolymers, ethylene-vinyl acetate copolymers, ethylene-acrylic acid copolymers, vinyl chloride-ethylene copolymers, polystyrenes, copolymers of styrene and other monomers such as butadiene, etc., may be used either singly or in combination of two or more of them for preparation of foams according to this invention. Said thermoplastic resins may contain as a modifier such materials as chlorinated polyethylene, chlorosulfonated polyethylene, polybutadiene, etc., and, if need be, one or more other additives such as coloring matters, ultraviolet absorbers, flame-retardants, crosslinking assistants, etc. It is noteworthy that since foams obtained by using the blowing agent composition of this invention are finished colorless, mixing of a color pigment allows finish with clearer color tone than conventional products.

It is possible according to this invention to obtain a whitened highly expanded foam (with a degree of expansion of preferably greater than 5 times) by heat-expanding a resin preform containing the blowing agent composition of this invention, preferably under normal pressure, after introducing crosslinking structure into the expandable resin perform or in the course of introducing such crosslinking structure. A recommendable means for introducing said crosslinking structure is to mix the thermoplastic resin with a crosslinking agent which is capable of producing radicals by heating. Examples of such a crosslinking agent are di-t-butyl peroxide, dicumyl peroixde, di-butylcumyl peroxide, 2,2'-bis(t-butyl peroxy)-p-di-isopropylbenzene, 2,5-di-methyl-2,5-di-(t-butyl peroxy)hexane, 2,5-di-methyl-2,5-di(t-butyl peroxy)-hexyne-3, etc., and these agents may be used either singly or in admixture.

Another method for introducing said crosslinking structure is to apply ionizing radiation such as X-rays, α-rays, β-rays or neutron rays to the thermoplastic resin preform containing the blowing agent.

Desired crosslinking may be also accomplished by graft polymerizing a vinylsilane compound such as vinyltrimethoxysilane onto the thermoplastic resin and then introducing siloxane bonds. In case of employing a radical-producing type crosslinking agent, formation of crosslinking structure and foaming can be performed in a single step. In other methods, the crosslinking step usually precedes the foaming step.

The thermoplastic resin preform containing a blowing agent composition of this invention is finished into a highly expanded article by heating said preform by suitable means such as infrared heating, hot-air heating, hot-plate heating, or heating in or over liquid, such heating means being usuable either singly or in combination.

This invention is further illustrated by way of the following Examples and Comparative Examples, in which all parts and percents are by weight unless otherwise noted.

EXAMPLES 1–4 AND COMPARATIVE EXAMPLES 1–2

To 100 parts of low density polyethylene (MI 1.6, specific gravity 0.921), 15 parts of a mixture obtained by mixing 100 parts of AC and 10 parts of DPT, and 0.8 part of dicumyl peroxide were added together with specified amounts (shown in Table 1) of the component (c) (1,3,5-tris-(3,5-di-t-butyl-4-hydroxybenzyl)-S-triazine-2-4-6-(1H, 3H, 5H)trion). The resulting each mixture was kneaded by 8″ mixing rolls kept at 120° C. and formed into a 1.5 mm thick sheet at 120° C. The thus formed sheets were expanded in hot air of 230° C. to obtain the foams shown in Table 1.

Measurements of foaming behavior (relation between heating time and specific gravity when heated in hot air of 230° C.) for Comparative Example 1 and Example 2 showed that, in the case of Comparative Example 1 (curve I in the drawing), foaming takes place quickly, the extent of foaming is very unstable and does not converge to a fixed value, and specific gravity at the highest point of expansion is large. On the other hand, in the case of this invention (Example 2, curve II in the drawing), the extent of foaming is improved and maintained at a constant value and stable foaming is performed.

EXAMPLE 5 AND COMPARATIVE EXAMPLE 3

100 parts of low density polyethylene (MI 3.5, s.g. 0.922), 8 parts of a mixture obtained by mixing 100 parts of AC and 15 parts of DPT, and 0.3 parts of the component (c) (pentaerythrityl-tetrakis-[3-(3,5-di-t-butylhydroxyphenyl)-propionate]) were mixed and kneaded by 8″ mixing rolls of 120° C. and formed into a 0.5 mm thick sheet at 140° C. This sheet was irradiated with electron rays of 5 Mrad by using a Cockcroft electron-ray accelerator to introduce crosslinking structure and foamed in hot ait at 230° C. to obtain a white foam with specific gravity of 0.048, very beautiful surface and good touch.

The same blend as mentioned above except for containing no component (c) was similarly formed into a sheet and foamed to obtain a foam with specific gravity of 0.059. However, foaming was quick and unstable, the surface was uneven and rough, appearance was bad, and cracks sometimes developed in the sheet periphery in the course of foaming. Thus, the obtained foam was poor one.

EXAMPLES 6–11

Foams were produced under the same conditions as Example 1 except for change of the component (c) as shown in Table 2. The results of meaurements on these foams were as shown in Table 2.

TABLE 1

| | Component (c) loading (per 100 parts of polyethylene) | Foams | | |
|---|---|---|---|---|
| | | Specific gravity | Surface appearance | Foaming condition |
| Comparative Example 1 | 0 | 0.042 | Rough, poor touch, uneven, poor appearance | Cracks developed at sheet periphery |
| Example 1 | 0.1 | 0.033 | Smooth, good touch, white and beautiful, good appearance | Stable foaming was possible |
| Example 2 | 0.3 | 0.032 | Smooth, good touch, white and beautiful, good appearance | Stable foaming was possible |
| Example 3 | 0.7 | 0.034 | Smooth, good touch, white and beautiful, good appearance | Stable foaming was possible |
| Example 4 | 1.0 | 0.037 | Smooth, good touch, white and beautiful, good appearance | Stable foaming was possible |
| Comparative Example 2 | 2.0 | 0.040 | Creases were formed | Unstable foaming |

TABLE 2

| | Component (C) | Foams | |
|---|---|---|---|
| | | Specific gravity | Surface appearance etc. |
| Example 6 | 2,5-Di-t-butylhydroquinone | 0.033 | Smooth surface, good touch, white and beautiful appearance |
| Example 7 | Octadecyl-3-(3,5-di-t-butyl-4-hydroxyphenyl)-propionate | 0.033 | Smooth surface, good touch, white and beautiful appearance |
| Example 8 | 2,6-Di-t-butyl-4-methyl-phenol | 0.033 | Smooth surface, good touch, white and beautiful appearance |

TABLE 2-continued

| | | Foams | |
|---|---|---|---|
| | Component (C) | Specific gravity | Surface appearance etc. |
| Example 9 | 2,5-Di-t-amylhydroquinone | 0.033 | Smooth surface, good touch, white and beautiful appearance |
| Example 10 | 2,2'-Methylenebis(4-ethyl-6-t-butylphenol) | 0.035 | Smooth surface, good touch, white and beautiful Appearance (The surface was somewhat rugged) |
| Example 11 | Distearyl-3,3'-thiodipropionate | 0.036 | Smooth surface, good touch, white and beautiful appearance (The surface was somewhat rugged) |

As described above, this invention can perfectly eliminate coloring (yellowing) of the foams originating from the blowing agent AC and makes it possible to produce stably white and beautiful foamed products composed of homogenous and fine foams with high expansion and improved touch.

What is claimed is:

1. A blowing agent composition for use in the production of cellular thermoplastic resins comprising:
   (a) azodicarbonamide,
   (b) dinitrosopentamethylenetetramine, and
   (c) at least one third component selected from the group consisting of octadecyl-3-(3,5-di-t-butyl-4-hydroxyphenyl)-propionate, 2,2'-thiodiethylbis-[3-(3,5-di-t-butyl-4-hydroxyphenyl)-propionate], pentaerythrityl-tetrakis-[3-(3,5-di-t-butylhydroxyphenyl)-propionate], 1,3,5-tris-(3,5-di-t-butyl-4-hydroxybenzyl)-s-triazine-2-4-6-(1H, 3H, 5H)trion, 2,2'-methylenebis-(4-ethyl-6-t-butylphenol), 2,5-di-t-butylhydroquinone, 2,5-di-t-amylhydroquinone, distearyl-3,3'-thiodipropionate, and 2,6-di-t-butyl-4-methylphenol,
   wherein component (b) is present in the amount of from 3 to 30 parts by weight based on 100 parts by weight of component (a), and component (c) is present in the amount of 0.5 to 10 parts by weight based on 100 parts by weight of components (a) and (b).

2. A blowing agent composition according to claim 1, wherein the component (c) is 1,3,5-tris(3,5-di-t-butyl-4-hydroxybenzyl)-S-triazine-2-4-6-(1H, 3H, 5H)trion, 2,5-di-t-butylhydroquinone, octadecyl-3-(3,5-di-t-butyl-4-hydroxyphenyl)-propionate, 2,6-di-t-butyl-4-methylphenol, or distearylthiodipropionate.

3. A blowing agent composition according to claim 1, wherein the thermopoastic resin is a polyolefin.

4. A blowing agent composition according to claim 3, wherein the polyolefin is polyethylene.

5. A blowing agent composition according to claim 1, including a thermoplastic resin selected from the group consisting of polypropylene, polybutene-1, ethylene-propylene copolymer, ethylene-vinyl acetate copolymer, ethylene-acrylic acid copolymer, and vinyl chloride-ethylene copolymer.

6. A blowing agent composition according to claim 3, wherein the amount of the component (c) is 0.1 to 1.0 parts by weight per 100 parts by weight of the polyolefin.

* * * * *